J. A. ANDERSON.
FLEXIBLE HARROW.
No. 183,245.  Patented Oct. 17, 1876.
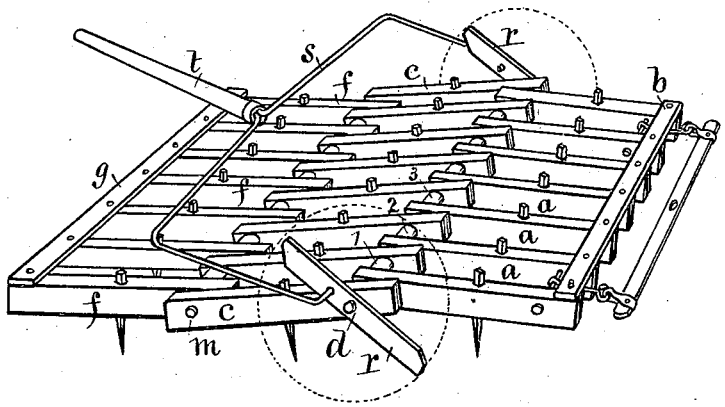
Witnesses.
C. A. Johnson.
G. Alvah Smith.
Inventor,
John A. Anderson,
By Thomas G. Orwig, Atty.

UNITED STATES PATENT OFFICE.

JOHN A. ANDERSON, OF DES MOINES, IOWA.

IMPROVEMENT IN FLEXIBLE HARROWS.

Specification forming part of Letters Patent No. 183,245, dated October 17, 1876; application filed April 1, 1876.

*To all whom it may concern:*

Be it known that I, JOHN A. ANDERSON, of Des Moines, in the county of Polk and State of Iowa, have invented an Improved Flexible Harrow, of which the following is a specification:

The object of my invention is to simplify the construction of a flexible harrow in such a manner that the bars and teeth may be readily adjusted and increased or diminished in number, and the harrow lifted and cleaned by use of the draft applied to drag it. It consists in several series of short parallel teeth-bearing bars, two pivoted tumblers, and a forked lever, arranged and combined to form a flexible harrow that can be readily governed by the driver, to be automatically lifted and cleaned while in operation, all as hereinafter fully set forth.

My drawing is a perspective view, illustrating the construction and operation of my invention.

$a\ a$ represent a series of short bars, each carrying a fixed tooth, pivoted at their front ends to a cross-bar, $b$. $c\ c\ c$ is a second series of bars, pivoted to the rear ends of the front series $a\ a$ by means of a rod, $d$, passed through each individual bar $a$ and $c$. $f\ f$ represent a third series of bars, pivoted at their rear ends to the cross-bar $g$, and at their front ends to the bar $c$ by means of a rod, $m$, passed through each individual bar $c$ and $f$. $r\ r$ are short bars, pivoted by means of the rod $d$ to the outside of the harrow, and form tumblers designed to lift the harrow, or the two front series of bars $a$ and $c$. $s\ t$ represent a forked lever, pivoted to the tumblers $r$ in such a manner that the tumblers can be thereby adjusted and retained in such a position that their lower ends will run into the ground as the harrow advances and revolve on their pivot and fulcrum $d$, and thereby lift the harrow sufficiently to allow all weeds and obstructions gathered by the teeth to drop out. 1 2 3 represent a series of washers or blanks, that can be placed between the pivoted bars to increase the distance or space between the teeth carried by the bars. By having blanks of different thickness, or by placing two or more of the same size together between the individual bars, the bars and teeth can be readily spread and adjusted to have the teeth crowded or scattered. The front and rear series of bars $a$ and $f$ being pivoted to the cross-bars $b$ and $g$ allows them to be spread and adjusted in such a manner that the size of the complete harrow can be increased or diminished by adding to or taking from the central series of bars $c\ c$.

I claim as my invention—

1. The series of short teeth-bearing bars $a\ c\ f$, the end cross-bars $b\ g$, the connecting-rods $d\ m$, the series of blanks 1 2 3, the tumblers $r\ r$, and the forked lever $t\ s$, all arranged and combined substantially as and for the purposes shown and described.

2. The pivoted tumblers $r$ and lever $s\ t$, in combination with a harrow, substantially as and for the purposes set forth.

JOHN A. ANDERSON.

Witnesses:
G. ALVAH SMITH,
R. G. ORWIG.